(No Model.)
R. S. WIESENFELD.
SOFT TREAD HORSESHOE.
No. 604,816. Patented May 31, 1898.
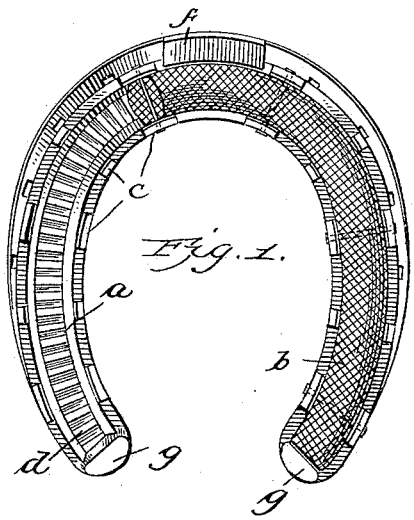
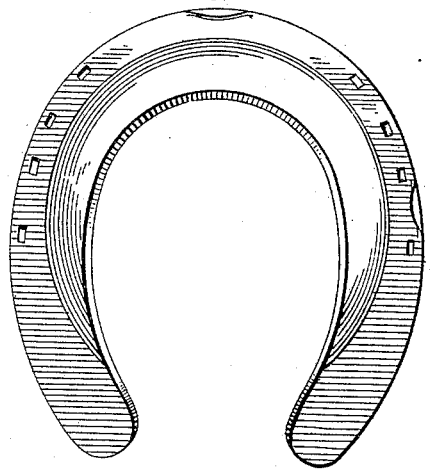
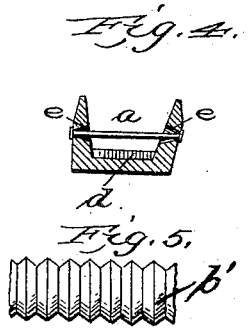
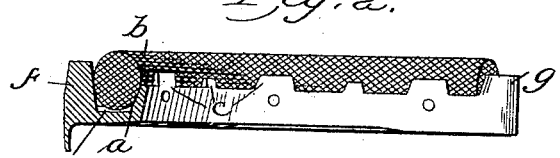
Attest
F. L. Middleton
L. B. Middleton
Inventor
Robert S. Wiesenfeld
by Ellis Spear
Atty.

UNITED STATES PATENT OFFICE.

ROBERT S. WIESENFELD, OF BALTIMORE, MARYLAND, ASSIGNOR OF ONE-HALF TO JOSEPH FRIEDENWALD, OF SAME PLACE.

SOFT-TREAD HORSESHOE.

SPECIFICATION forming part of Letters Patent No. 604,816, dated May 31, 1898.

Application filed May 7, 1897. Serial No. 635,534. (No model.)

*To all whom it may concern:*

Be it known that I, ROBERT S. WIESENFELD, a citizen of the United States, residing at Baltimore, in the State of Maryland, have invented certain new and useful Improvements in Soft-Tread Horseshoes, of which the following is a specification, reference being had therein to the accompanying drawings.

My invention relates to horseshoes of that class in which the shoe is channeled and a rubber tread is secured within the channel.

The present invention is an improvement upon a former invention for which I made application in the Patent Office for Letters Patent on December 29, 1896, Serial No. 617,361, the improvements residing particularly in the means of attaching the rubber tread.

The invention is illustrated in the accompanying drawings, in which—

Figure 1 is a plan view with part of the tread shown as removed. Fig. 2 is a cross-sectional view. Fig. 3 is a bottom view. Fig. 4 is section; Fig. 5, a modified view of a portion of the rubber tread.

In carrying out my invention I make the shoe of the proper shape and dimension, of metal, by any well-known or improved method and provide a channel $a$, conforming to the shape of the shoe, this channel being closed at the ends. Between the walls of the channel the rubber tread is located, as shown at $b$. The tread is cut to the proper length to fit the channel, which is adapted to receive a little less than one-half of the diameter of the tread, and in order to hold the rubber in place and prevent its displacement and at the same time to leave the entire upper surface free from metallic projections I provide a series of tongues $c$, made integral with the side walls of the channel, and these may be bent inward to grip the rubber or other elastic tread and thus hold the same. To still further add to the security of the holding means, I provide the bottom of the channel with corrugations $d$, and these tend to grip the periphery of the tread within the channel. In order to positively engage the tread with the shoe and prevent all possibility of its slipping, I form openings in the walls of the shoe adjacent to the channel and in line with each other, as shown at $e$, and after the tread is in place I insert screws, nails, or other fastening devices, which in passing across the channel, above the bottom thereof, penetrate the tread and thus positively secure the tread in place. In order to facilitate the driving of the nails and cause them to register with the opening in the opposite walls, I make the inside of the opening flaring, so that the end of the nail, screw, or other device will be directed into the opening.

I make the channel in the shoe with walls flaring inwardly, so that these walls are thicker as they approach the base of the shoe.

By the construction described I provide very efficient holding means for the rubber tread, the various means supplementing each other so as to absolutely prevent the displacement of the tread.

The shoe may be provided with any ordinary or improved toe and heel calks, as may be desired.

I prefer, as shown in the drawings at $f\ g$, to make the shoe with integral heels and toes, and in this way, in connection with the rubber tread, I secure not only the support by the heels and toe, but also get support for the shoe laterally through the tread. As shown, the heels and toe are above the side walls of the channel and take the wear from these walls. As shown in the modification seen in Fig. 5, I may make the rubber tread $b'$ corrugated instead of smooth, and the corrugations may be of any form, the purpose being to provide a surer grip and also by engaging the corrugations of the channel to prevent the slipping of the tread.

What I claim is—

1. In a horseshoe having a channeled under face, a tread located in the channel, and alining openings in the walls of the channel, the openings in one wall having flaring mouths on the inside of the walls, and fastening means extending through the tread and the openings in the walls, the flaring mouths guiding the fastening means to the openings substantially as described.

2. In a horseshoe, a channel in its under face with corrugated bottom, a tread located therein, laterally-extending fastening means, and tongues on the edges of the walls adapted to be bent inwardly to secure the tread in place, substantially as described.

3. A horseshoe having a channeled under face, the bottom of the channel being corrugated, and a solid corrugated tread fitting said channel, and tongues on the edges of the channel to hold the tread in place.

4. A horseshoe having a channeled under face, a tread located therein and extending above the walls of the channel, and heels and toe-pieces also extending above the walls of the channel, substantially as described.

In testimony whereof I affix my signature in presence of two witnesses.

ROBT. S. WIESENFELD.

Witnesses:
   HENRY E. COOPER,
   F. L. MIDDLETON.